(12) United States Patent
Nonomura

(10) Patent No.: US 12,496,517 B2
(45) Date of Patent: Dec. 16, 2025

(54) VIRTUAL EXPERIENCE DEVICE ENABLING EXPERIENCING FEELING OF FALLING

(71) Applicant: Logilicity Co., Ltd., Tokyo (JP)

(72) Inventor: Tetsuya Nonomura, Tokyo (JP)

(73) Assignee: Logilicity Co., Ltd., Tokyo (JP)

( * ) Notice: Subject to any disclaimer, the term of this patent is extended or adjusted under 35 U.S.C. 154(b) by 251 days.

(21) Appl. No.: 18/275,503

(22) PCT Filed: Feb. 17, 2021

(86) PCT No.: PCT/JP2021/005846
§ 371 (c)(1),
(2) Date: Aug. 2, 2023

(87) PCT Pub. No.: WO2022/176044
PCT Pub. Date: Aug. 25, 2022

(65) Prior Publication Data
US 2024/0115939 A1 Apr. 11, 2024

(51) Int. Cl.
*A63F 13/285* (2014.01)
(52) U.S. Cl.
CPC .... *A63F 13/285* (2014.09); *A63F 2300/8082* (2013.01); *A63F 2300/8094* (2013.01)
(58) Field of Classification Search
CPC ............ A63F 13/285; A63F 2300/8082; A63F 2300/8094; A63G 31/06; A63G 31/16; G06F 3/011; G09B 9/28; G02B 27/017; G06T 19/003
See application file for complete search history.

(56) References Cited

U.S. PATENT DOCUMENTS

2020/0298133 A1\* 9/2020 Magpuri .................. A63G 7/00

FOREIGN PATENT DOCUMENTS

| JP | 53-140560 U | 11/1978 |  |
|----|----|----|----|
| JP | 2020-517366 A | 6/2020 |  |
| JP | 2020-178869 A | 11/2020 |  |
| KR | 20020038164 A \* | 5/2002 | ............ A63G 31/16 |
| KR | 20180094308 A | 8/2018 |  |
| KR | 20210007716 A | 1/2021 |  |
| WO | 2018200413 A1 | 11/2018 |  |

OTHER PUBLICATIONS

Google Patents translation of KR-20020038164-A (Year: 2002).\*
(Continued)

*Primary Examiner* — Peter J Iannuzzi
(74) *Attorney, Agent, or Firm* — Renner, Otto, Boisselle & Sklar, LLP

(57) ABSTRACT

A virtual experience device that enables experiencing a feeling of falling includes an instrument in which a rotation support portion that rotatably supports a flat plate is formed, and a VR headset including, in the inside, at least a height sensor and a display that performs display on a virtual space. The VR headset includes the sensor that detects a second state of when a height from a floor surface on which the instrument is installed is equal to or less than a predetermined height. Further, the virtual experience device includes video software including a stop video and a falling video switched from the stop video when the second state is established.

3 Claims, 8 Drawing Sheets

(56) References Cited

OTHER PUBLICATIONS

International Search Report for corresponding Application No. PCT/JP2021/005846, mailed on May 18, 2021.
Omoracy VR, VR bungee jumping equipment, online (Dec. 22, 2018).
Omoracy, online (Sep. 28, 2020).
Non-Patent Litereature VR bungee jumping experience, online (Nov. 10, 2020).
VZFIT (https://www.virzoom.com/), downloaded Aug. 2, 2023 (cited in specification).
Ryujin Otsuribashi Bungee VR (https://play.google.com/store/apps/details?id=jp.co.ohtsuribashi.bungee), downloaded Aug. 2, 2023 (cited in specification).

* cited by examiner

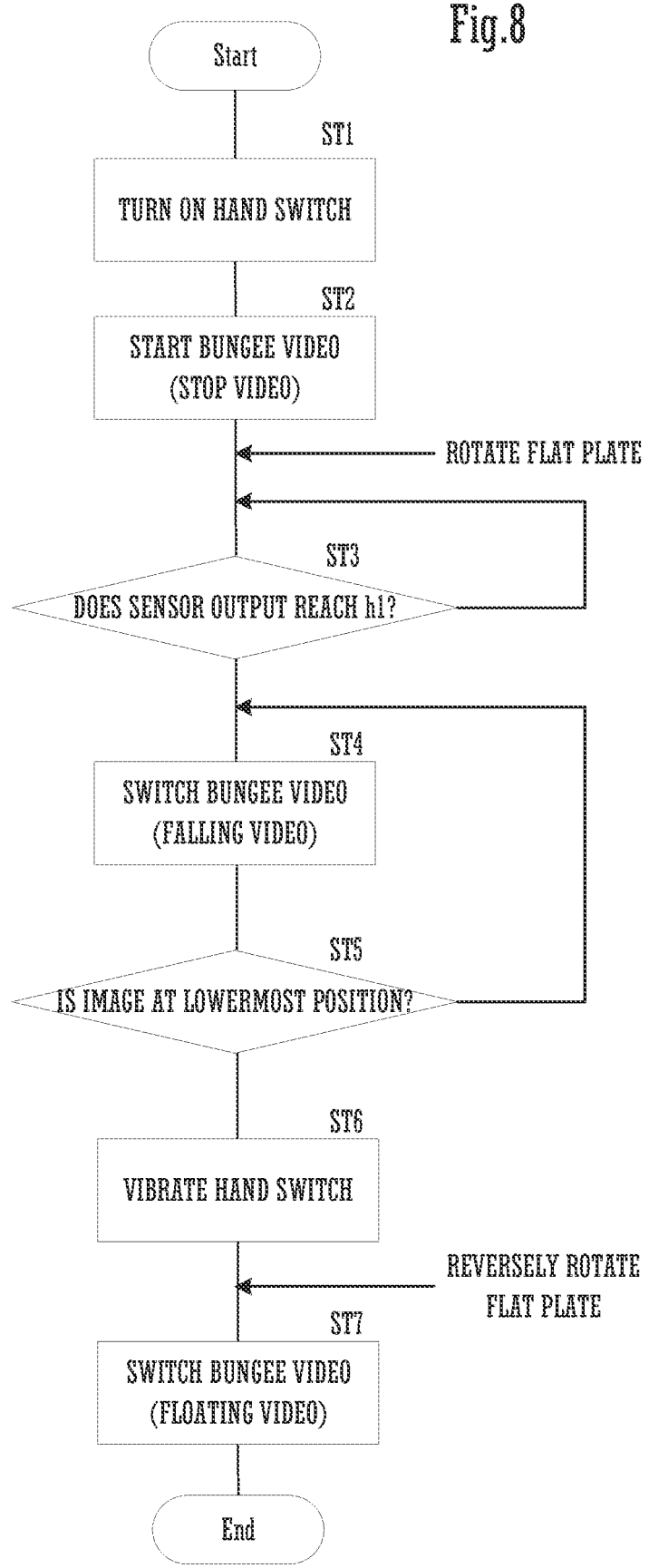

VIRTUAL EXPERIENCE DEVICE ENABLING EXPERIENCING FEELING OF FALLING

TECHNICAL FIELD

The present invention relates to a virtual experience device that enables virtually experiencing a feeling of falling, such as one experienced in bungee jump or a roller coaster.

BACKGROUND ART

Various gymnastic training devices that promote health by allowing a body to be moved using an exercise instrument have been put into practical use. For example, a training device in which a body is fixed on a rotatable flat plate, and the body is rotated back and forth in a seesaw-like manner by repeating of rotation and reverse rotation of the flat plate has been proposed (Patent Literature 1).

On the other hand, a training device for promoting health by a combination of an exercise instrument and a virtual reality (VR) headset has also been put into practical use. For example, there is a commercially available training device (software) in which an exercise instrument in a form of a bicycle used in a room referred to as an exercise bike (registered trademark in Japan) or a spinning bike, and a VR headset are combined, and a video of Street View (registered trademark) is advanced in the VR headset according to rotation of a pedal to which a spin sensor connected to the VR headset by Bluetooth (registered trademark in Japan) is attached (Non Patent Literature 1).

Further, various types of software in which the user can enjoy a 3D video or a more realistic game by using a VR headset and a hand switch are becoming widespread. Among them, bungee VR software that plays a video at the time of a roller coaster or a video at the time of bungee jump in a VR headset is also included (Non Patent Literature 2).

CITATION LIST

Patent Literature

[Patent Literature 1]
Utility Model Publication No. 53-140560

Non Patent Literature

[Non Patent Literature 1]
VZFIT (https://www.virzoom.com/)
[Non Patent Literature 2]
Ryujin Otsuribashi Bungee VR (https://play.google.com/store/apps/details?id=jp.co.ohtsuribashi.bungee)

SUMMARY OF INVENTION

Technical Problem

However, since a training device that uses only an exercise instrument is intended to promote health, the training device itself does not have a game property. Further, a combination of an exercise instrument and a VR headset has a limit to enjoyment as a game, and it is not possible to exhibit a sense of fear and a sense of challenge that are supported by young people. Further, in a game using a VR headset and a hand switch, even in a case of bungee jump video software, a sense of fear and a sense of challenge are insufficient because a body does not move, and a sense of satisfaction is also insufficient compared to an actual bungee jump in terms of bodily sensation.

In view of the above, an object of the present invention is to provide a virtual experience device that enables experiencing a feeling of falling, by which a bodily sensation closer to one obtained in an actual bungee jump or a roller coaster can be obtained.

Solution to Problem

A virtual experience device that enables experiencing a feeling of falling according to the present invention includes a flat plate to which an experiencing person is fixed, an instrument on which a rotation support portion that rotatably supports the flat plate is formed, the instrument allowing the flat plate to rotate from a first state in which a head is positioned above a foot of the experiencing person to an inverted state in which a body of the experiencing person is inverted, and a VR headset attached to the head of the experiencing person. The VR headset includes a sensor that detects a second state of when the instrument rotates from the first state and a height from a floor surface on which the instrument is installed becomes equal to or less than a predetermined height, a display that displays a video in a virtual space, and video software including a stop video displayed on the display in the first state and a falling video displayed on the display from when the second state is established.

An experiencing person in a posture of a prone position is fixed to the flat plate. For example, a belt is used to fix the experiencing person, and ankles and the abdomen of the experiencing person are fixed to the flat plate with the belt. The flat plate to which the experiencing person is fixed is rotatable from the first state in which the head is positioned above the foot to the inverted state in which the body of the experiencing person is inverted.

The experiencing person attaches the VR headset to the head with an attached belt or the like. A sensor provided in the VR headset detects the second state. As this sensor, a positioning sensor that detects a position of the VR headset can be used. The positioning sensor includes, for example, a plurality of cameras arranged in the VR headset. By processing an image captured by these cameras, a position (position on three axes) of the VR headset is detected. As another example of the positioning sensor, a gyro sensor can be used, and a known sensor such as an infrared sensor or an LED sensor can also be used. In the present invention, any sensor may be used as long as the sensor can detect at least a height on a Z axis. Note that these sensors desirably have a function of tracking a change in a position of the VR headset.

Further, video software is installed in advance in the VR headset.

The video software includes the stop video displayed on the display in the first state and the falling video displayed on the display from when the second state is established. The stop video is a video of the surroundings before falling, and the falling video is a video in a falling direction after falling. The video software is, for example, bungee jump video software (bungee video software).

With the above configuration, the experiencing person is fixed to the flat plate in a posture of a prone position, and the video software is activated. At this time, the experiencing person is in the first state in which the head is located above the foot, the video software outputs the stop video, and the display in the VR headset displays the stop video. If the sensor of the VR headset is a sensor that detects a position of the VR headset and tracks the position, the stop video changes according to the detection output. That is, when the experiencing person rotates the head, a video following in the rotation direction is displayed as the stop video.

When the sensor detects the second state of when the instrument rotates from the first state and a height from a floor surface on which the instrument is installed becomes equal to or less than a predetermined height, the stop video is switched to the falling video. That is, when the flat plate starts to rotate forward from the first state, the stop video is switched to the falling video with establishment of the second state in which a height from a floor to a position of the VR headset is equal to or less than a predetermined height as a trigger. At this time, since the flat plate is rotating, the falling video is displayed on the display in the VR headset in synchronization with rotation of the body of the experiencing person.

As described above, by switching the video displayed on the display of the VR headset from the stop video to the falling video in synchronization with rotation of the flat plate, the experiencing person can experience a strong immersive feeling including a sense of fear of when falling downward from an uppermost position in a virtual space.

In a preferred embodiment, the falling video includes a video of falling even after the body of the experiencing person becomes in the inverted state. Time of the flat plate rotating from the second state to the inverted state is about one second, but time of the falling video is longer, for example, about four seconds. Therefore, the falling video further continues from when the experiencing person is in the inverted state and the rotation is stopped.

What is important here is that the falling video is displayed during one second in which the experiencing person changes from the second state to the inverted state. During this one second, the experiencing person has a bodily sensation of falling by the falling video and the actual rotation, so that the experiencing person is strongly impressed with a feeling of falling. For this reason, in a state where rotation is stopped in the inverted state after the above, the experiencing person has an illusion of being continuously falling only by displaying of the falling video. By the above, even when rotation is performed in short time of one second, falling for four seconds can be virtually experienced.

As described above, by first performing rotation of the flat plate and display of the falling video, it is possible to strongly impress the experience person with a feeling of falling. For this reason, after the above, it is possible to cause the experiencing person to have an illusion of a feeling of falling as before only by displaying the falling video. As described above, since a virtual experience with an actual feeling of falling is enabled by use of an illusion of a human brain, there is an advantage that only a simple structure is required.

Furthermore, in a preferred embodiment, the VR headset notifies the outside that the falling video is in a lowermost position state when the falling video reaches a lowermost position. The notification to the outside can be performed, for example, by vibrating a hand switch connected to the VR headset by Bluetooth (registered trademark in Japan). By notifying the outside that the falling video is in the lowermost position state, it is possible to further enhance an immersive feeling after the falling video reaches the lowermost position. For example, when grasping that the falling video is in the lowermost position state by vibration of a hand switch, an assistant reversely rotates the flat plate. At this time, the falling video is a video of when returning upward from the lowermost position. By this video and the reverse rotation of the flat plate, the experiencing person has an illusion of returning upward or floating due to negative acceleration near the lowermost position. Also in this case, use of an illusion of a human brain enables virtual experience of an actual falling state in the vicinity of the lowermost position.

Advantageous Effects of Invention

As described above, the present invention enables experiencing an actual falling state in a virtual space with a strong immersive feeling by a combination of an instrument in which a rotation support portion that rotatably supports a flat plate is formed and a VR headset incorporating a sensor.

BRIEF DESCRIPTION OF DRAWINGS

FIG. 8 is a flowchart illustrating operation of the virtual experience device 1.

DESCRIPTION OF EMBODIMENTS

Figure 1:
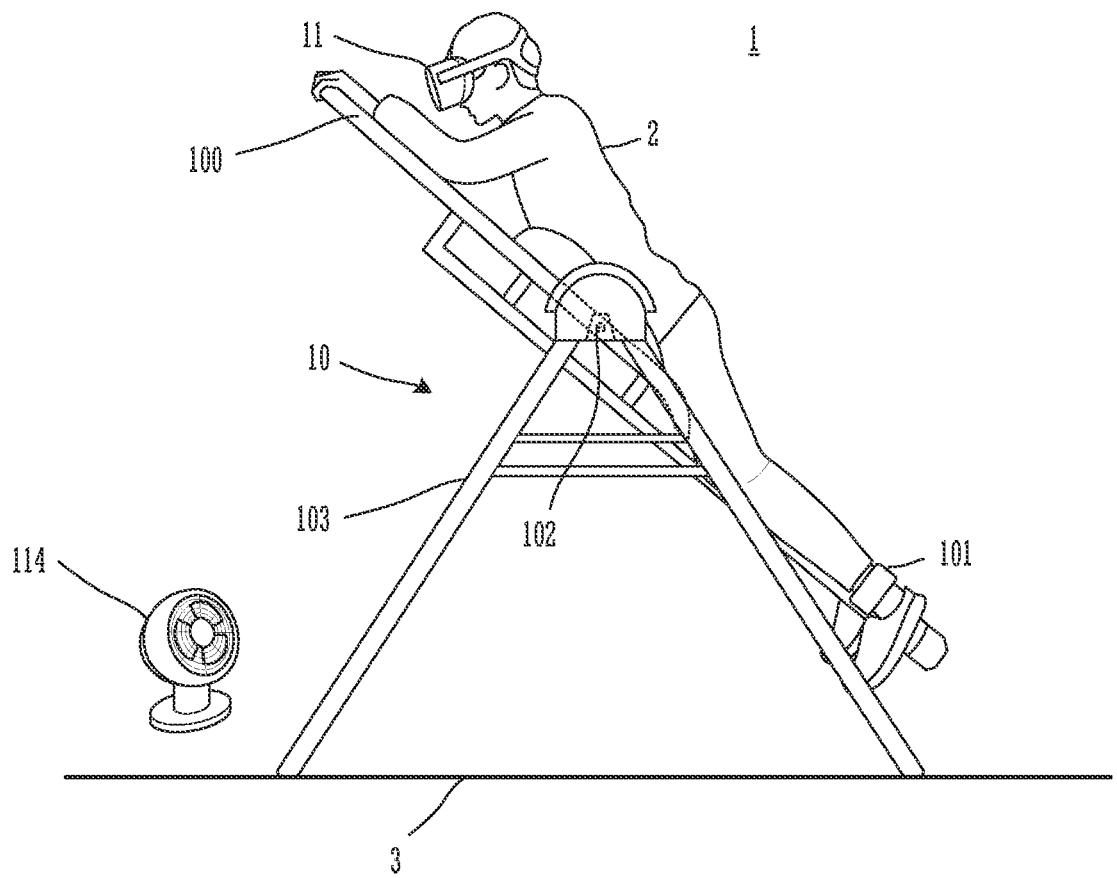
FIG. 1 is a diagram of a bungee jump virtual experience device of the present invention when an experiencing person is fixed to a flat plate.

FIG. 1 is a diagram of a bungee jump virtual experience device of the present invention when an experiencing person is fixed to a flat plate.

In FIG. 1, a virtual experience device 1 includes an instrument 10 and a VR headset 11.

The instrument 10 includes a flat plate 100 to which an experiencing person 2 in a prone position can be fixed, a belt 101 that fixes both ankles of the experiencing person 2 on the flat plate 100 to the flat plate 100, a rotation support portion 102 that rotatably supports the flat plate 100, and an instrument body 103 to which the rotation support portion 102 is fixed and that stably holds the flat plate 100.

The instrument body 103 has a structure having an inverted V-shape in a front view, and is installed on a flat floor 3. The reason why the instrument body 103 has an inverted V-shape is to facilitate transportation of the entire instrument body 103 by closing a vertical angle portion. The instrument body 103 may have any structure as long as the instrument body 103 can rotatably support the flat plate 100.

Figure 7:
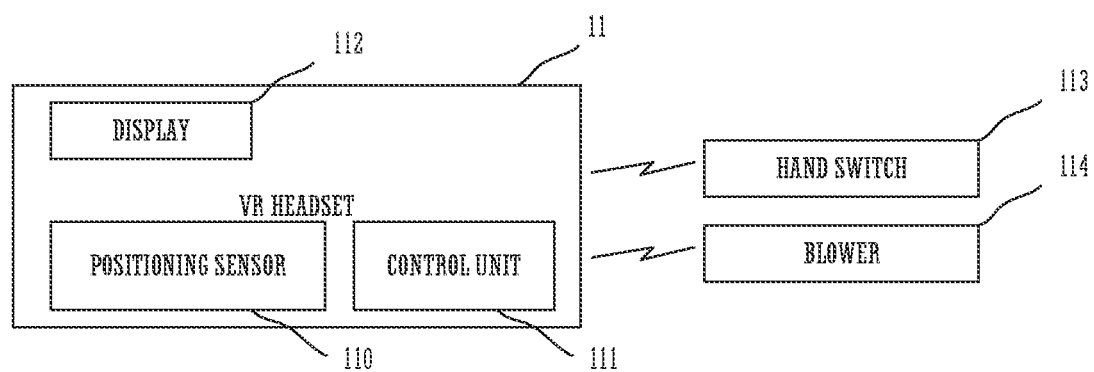
FIG. 7 illustrates an electrical configuration diagram of a virtual experience device 1.

The VR headset 11 is provided with a positioning sensor 110 including a plurality of cameras, a control unit 111, and a display 112 (see FIG. 7). The positioning sensor 110 includes, for example, a plurality of cameras arranged in the VR headset. By processing an image captured by these cameras, a position (position on three axes) of the VR headset 11 including a distance (height) between the floor 3 and the sensor 110 is detected. As another example of the positioning sensor 110, a gyro sensor can be used, and a known sensor such as an infrared sensor or an LED sensor can also be used. In the present invention, any sensor may be used as long as the sensor can detect at least a height on a Z axis. Note that these sensors desirably have a function of tracking a change in a position of the VR headset.

In FIG. 1, the experiencing person 2 lies on the flat plate 100, and both ankles are fixed to the flat plate 100 with the belt 101. This completes preparation for a bungee jump virtual experience. This state is a first state in which the head of the experiencing person 2 is located above a foot. Note that bungee video software is installed in advance in the VR headset 11, and the software is also in an operating state. The bungee video software includes a stop video showing a video of the surroundings before falling and a falling video at the time of falling. In the first state of FIG. 1, the stop video is displayed on the display 112 of the VR headset 11. The stop video is a video of the surroundings of the VR headset 11 before falling. Since the VR headset 11 is provided with the positioning sensor 110 having a tracking function, if the experiencing person 2 lowers his or her face so as to look downward, a video of facing a lowermost position at the time of jumping is displayed on the display 112 in the VR headset 11. Further, when the experiencing person 2 turns the neck to see the left and right, the video of the surroundings changes accordingly.

Figure 2:
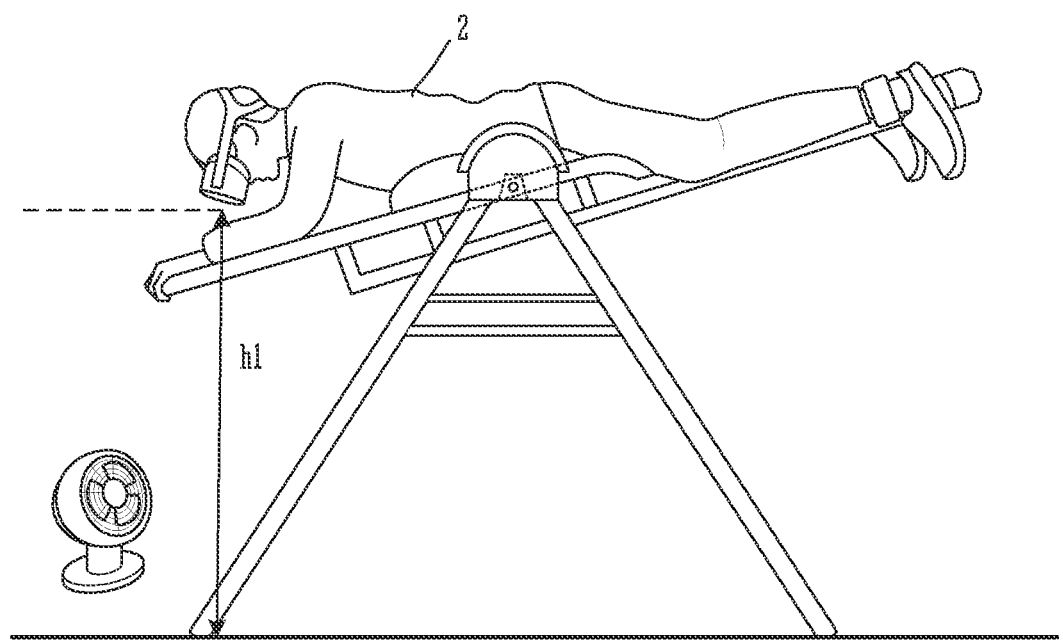
FIG. 2 is a diagram illustrating a state in which the flat plate is rotating in the bungee jump virtual experience device of the present invention.

From the state of FIG. 1, the flat plate 100 is slightly rotated forward as shown in FIG. 2. For example, an assistant lifts a bottom portion of the flat plate 100 upward to rotate the flat plate 100. In a case where there is no assistant, when an experiencing person himself or herself moves the center of gravity forward, the flat plate 100 rotates from the state of FIG. 1 as illustrated in FIG. 2. At this time, it is a state immediately before the experiencing person jumps down in an actual bungee jump, and a video of looking at a lowermost position in a state immediately before falling is displayed on the display 112.

FIG. 2 illustrates a state immediately before a distance between the positioning sensor 110 and the floor 3 becomes h1 in a state where the flat plate 100 is rotating in the bungee jump virtual experience device 1. That is, FIG. 2 illustrates a state in which a height of the VR headset 11 from the floor 3 is h1+Δ.

The positioning sensor 110 provided in the VR headset 11 detects that the VR headset 11 is lowered by several ten centimeters due to a change from the state of FIG. 1 to the state of FIG. 2. During this time, a video output from the bungee video software is a stop video, but since a positional change of the VR headset 11 according to a positional change of the head of the experiencing person 2 is tracked, a stop video according to the positional change is obtained. In FIG. 2, the stop video is a video of looking down from the top of a building.

When the flat plate 100 is further rotated from the state of FIG. 2 by an assistant or by a center-of-gravity movement of the experiencing person 2, a distance between the positioning sensor 110 and the floor 3 immediately becomes h1. This is a second state. With the second state as a trigger, the video of the bungee video software is switched from the stop video to a falling video. Further, the flat plate 100 rotates at once to an inverted state in FIG. 3.

As described above, when the flat plate 100 slightly rotates forward from the first state (FIG. 1) to a state immediately before falling (FIG. 2), and the flat plate 100 further rotates from this state, the flat plate 100 is brought into the inverted state (FIG. 3) at once through the second state in which a distance between the positioning sensor 110 and the floor 3 is h1, and the rotation of the flat plate 100 is stopped. Rotation time from FIG. 2 to FIG. 3 is around one second (hereinafter, referred to simply as one second).

As described later, the bungee video software outputs a stop video from the first state in FIG. 1 to the state in FIG. 2, and switches to output of a falling video when the flat plate 100 further rotates from FIG. 2 and a distance between the positioning sensor 110 and the floor 3 becomes h1 (the second state). Then, in the inverted state (FIG. 3), the falling video is further continuously output. The falling video has a length of about four seconds (hereinafter, simply referred to as four seconds). Therefore, the experiencing person 2 views the falling video during a period from the second state to the inverted state and then until several seconds further elapse.

Figure 3:
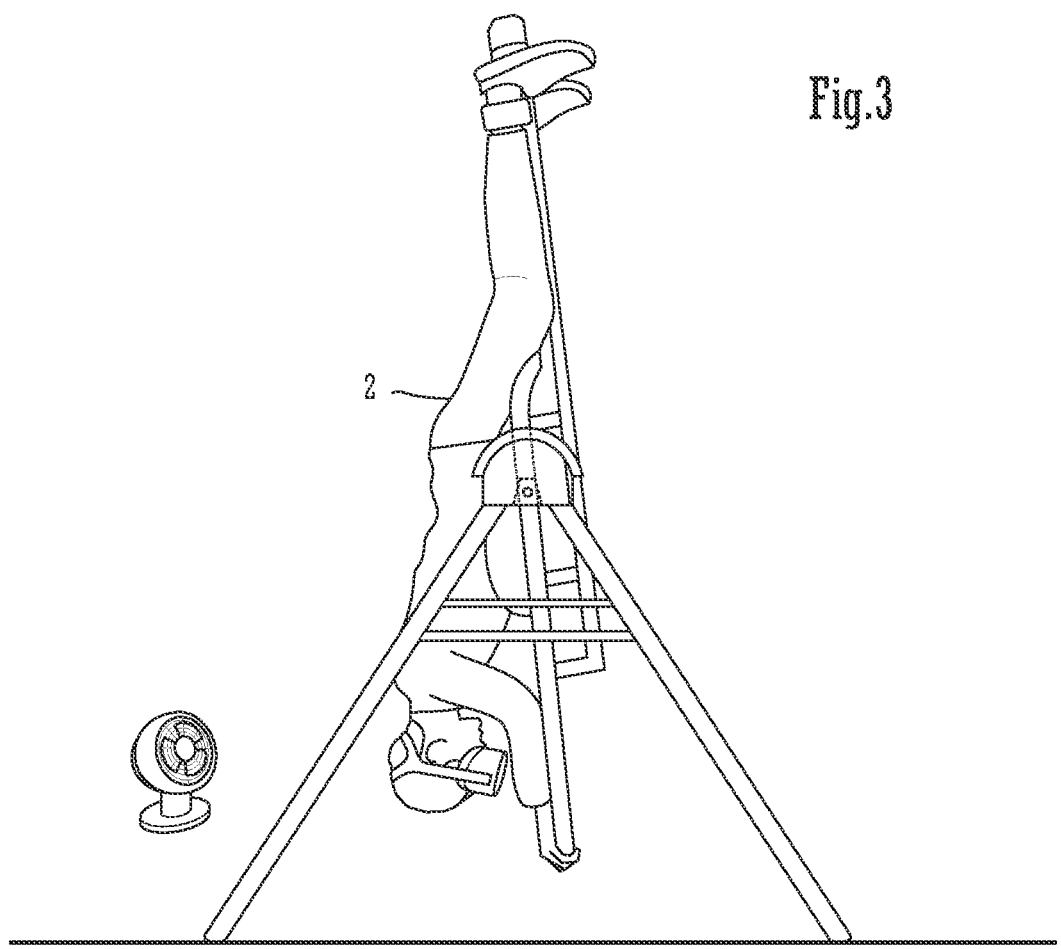
FIG. 3 is a diagram illustrating a state when the experiencing person is in an inverted state in the bungee jump virtual experience device of the present invention.

As described above, while the flat plate 100 further rotates from the second state in which a distance between the positioning sensor 110 and the floor 3 becomes h1 to the state of FIG. 3, the experiencing person 2 suddenly views the falling video from the stop video of when looking down from the top of the building. Further, the body of the experiencing person 2 rapidly turns by 90 degrees during the period to be in an inverted state. The falling video continues further for several seconds after the experiencing person 2 is in the inverted state.

What is important here is that the falling video is displayed during one second in which the experiencing person 2 changes from the second state to the inverted state. During this one second, the experiencing person has a bodily sensation of falling by the falling video and rotation of the flat plate 100, so that the experiencing person is strongly impressed with a feeling of falling. For this reason, even if the rotation is stopped in the inverted state after the above, the experiencing person has an illusion of being continuously falling only by displaying of the falling video after the above. Such an illusion is estimated to be caused by a cross-modal effect. The cross-modal effect refers to a phenomenon in which certain sensory information interferes with another piece of sensory information (mechanism) and the sensory information itself changes. In the present embodiment, the experiencing person is considered to have an illusion of being continuous falling is illusion in the inverted state as spatial perception is changed by a cross-modal effect by visual input by the VR headset 11, sensory input of gravitational acceleration due to rotation of the flat plate 100, bodily sensation input in the inverted state, and the like. The present embodiment can be considered to use an illusion due to the cross-modal effect. By the above, even when rotation is performed in short time of one second, falling for four seconds can be virtually experienced.

As described above, by first performing rotation of the flat plate 100 for short time of one (second) and display of a falling image in synchronization, it is possible to strongly impress the experiencing person 2 with a feeling of falling. For this reason, after the above, it is possible to cause the experiencing person 2 to have an illusion of a feeling of falling as before only by displaying the falling video. For this reason, only by rotating the flat plate 100 for short time, the experiencing person 2 can experience a strong immersive feeling of falling for time exceeding the rotation time.

In the present embodiment, the VR headset 11 notifies a hand switch 113 that the falling video is in a lowermost position state when the falling video reaches a lowermost position. The hand switch 113 vibrates at this time. Then, since an assistant can know that the falling video is in the lowermost position state, the assistant reversely rotates the flat plate 100. At this time, the falling video is switched to a floating video of returning upward from the lowermost position or floating near the lowermost position. By the floating video and the reverse rotation of the flat plate 100, the experiencing person 2 has an illusion of returning upward or floating due to negative acceleration near the lowermost position.

After the above, the flat plate 100 is returned to the original position in FIG. 1, and the experiencing person 2 is released from the flat plate 100.

In this way, the experiencing person 2 can obtain a virtual experience of bungee jumping. In the present embodiment, since the body of the experiencing person 2 rotates in synchronization with watching of a video of a bungee jump, immersive feeling at the time of falling is strong. For this reason, the experiencing person 2 can have a virtual experience including a sense of fear similar to one in an actual bungee jump.

Note that, in FIGS. 1 to 3, a blower 114 is disposed in front of the virtual experience device 1. The blower 114 gives wind at the time of falling to the experiencing person 2. The blower 114 starts blowing air when a stop video is displayed, and stops blowing air when a falling video completely ends. Further, as a variation, an air blowing amount is rapidly increased from start of display of the falling video. By controlling an air blowing amount in this manner, a feeling closer to one in an actual bungee jump can be obtained.

FIGS. 4A to 6I illustrate images (video frames) obtained by cutting out a stop video and a falling video displayed on the display 112 in the VR headset 11 by the bungee video software.

Figure 4A:
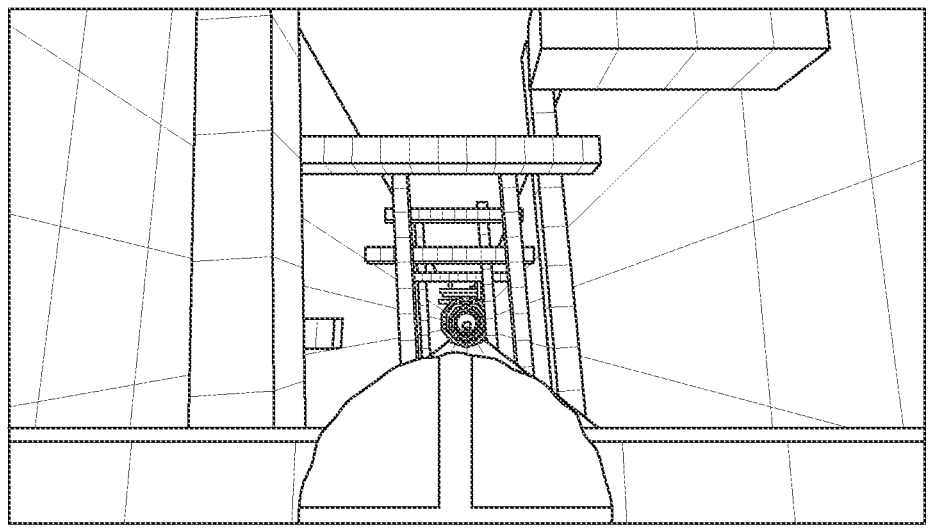
FIGS. 4A to 4C are cutout images of a stop video and a falling video of the bungee jump virtual experience device of the present invention.

FIG. 4A . . . Video frame of a stop video immediately before falling

Figure 4B:
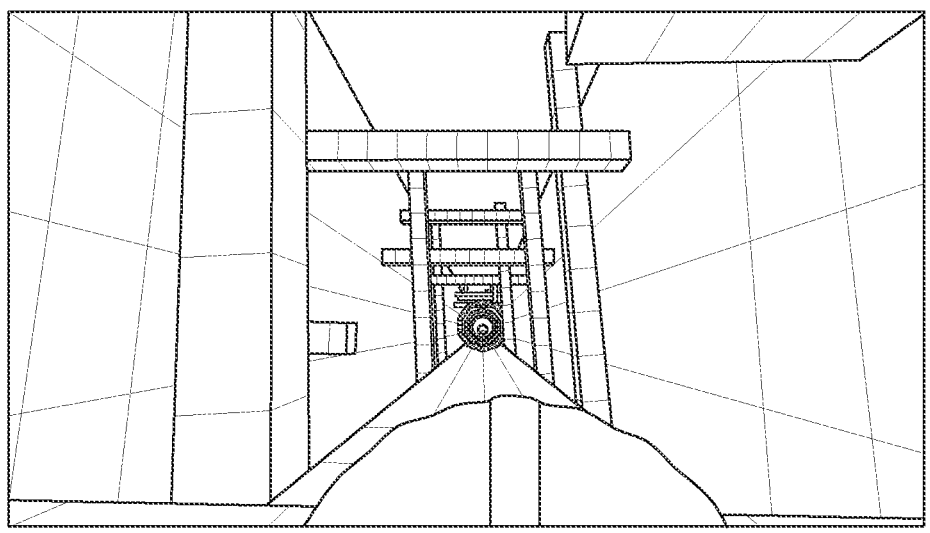

FIG. 4B . . . Video frame at t=0 immediately after start of falling

Figure 4C:
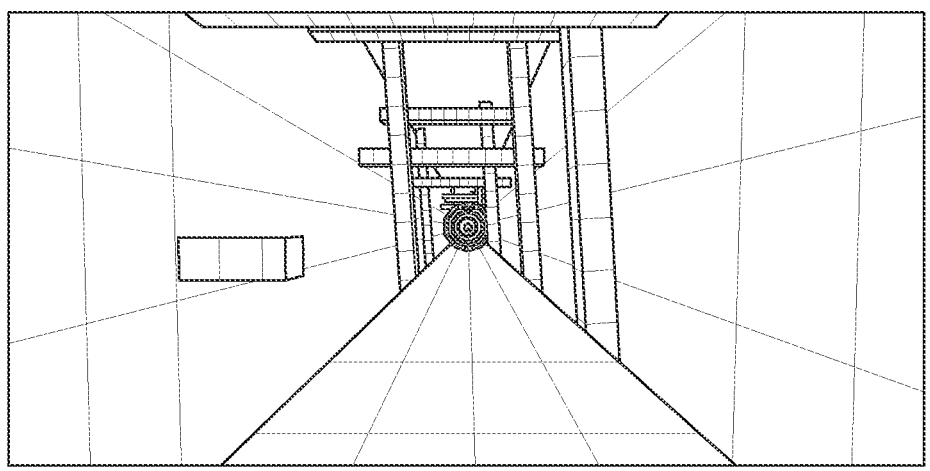

FIG. 4C . . . Video frame at t=1 immediately after start of falling

Figure 5D:
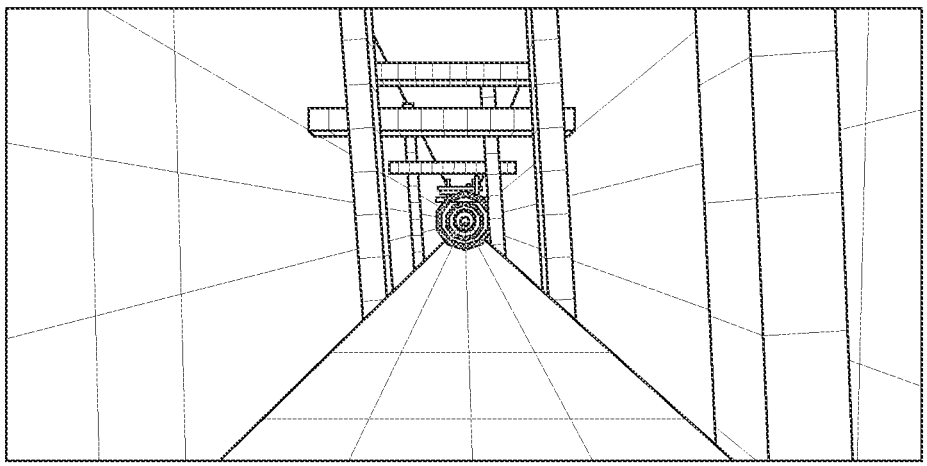
FIGS. 5D to 5F are cutout images of the falling video of the bungee jump virtual experience device of the present invention.

FIG. 5D . . . Video frame at t=2 immediately after start of falling

Figure 5E:
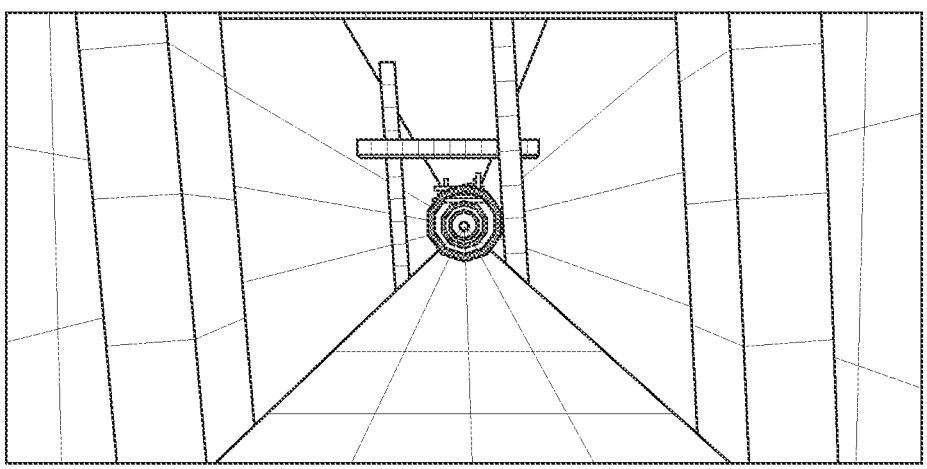

FIG. 5E . . . Video frame at t=3 immediately after start of falling

Figure 5F:
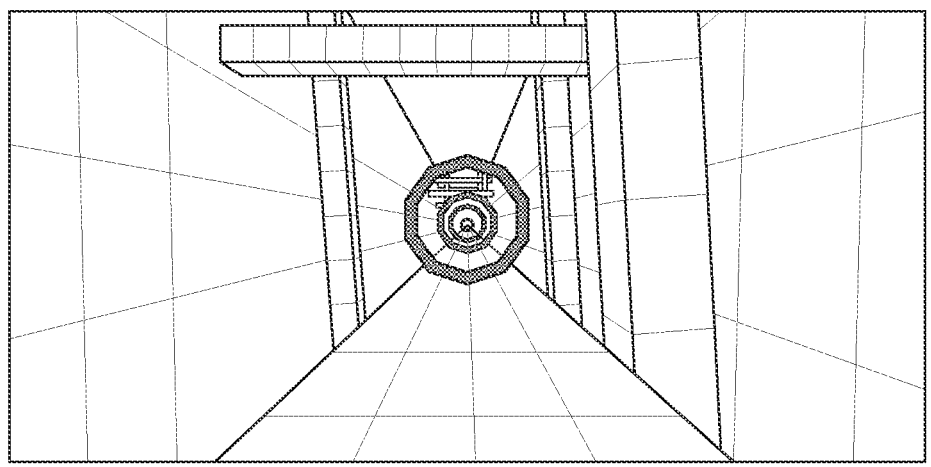

FIG. 5F . . . Video frame of t=4 immediately after start of falling

Figure 6G:
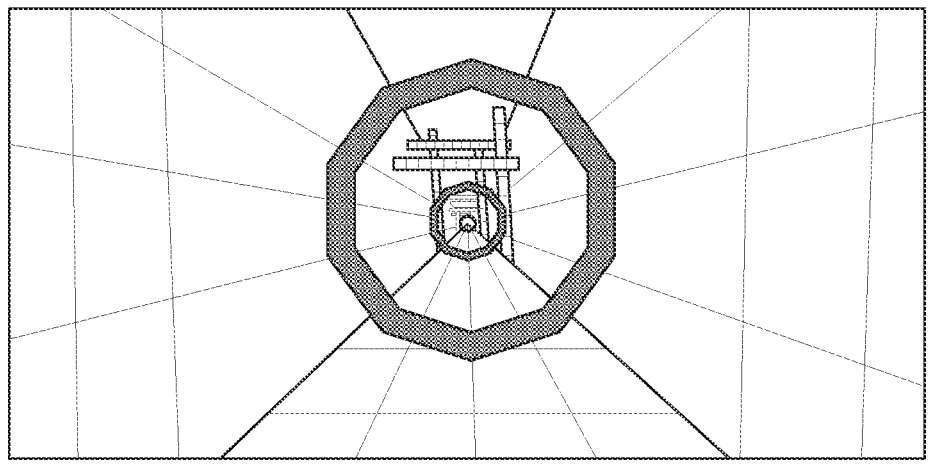
FIGS. 6G to 6I are cutout images of the falling video of the bungee jump virtual experience device of the present invention.

FIG. 6G . . . Video frame at t=5 immediately after start of falling

Figure 6H:
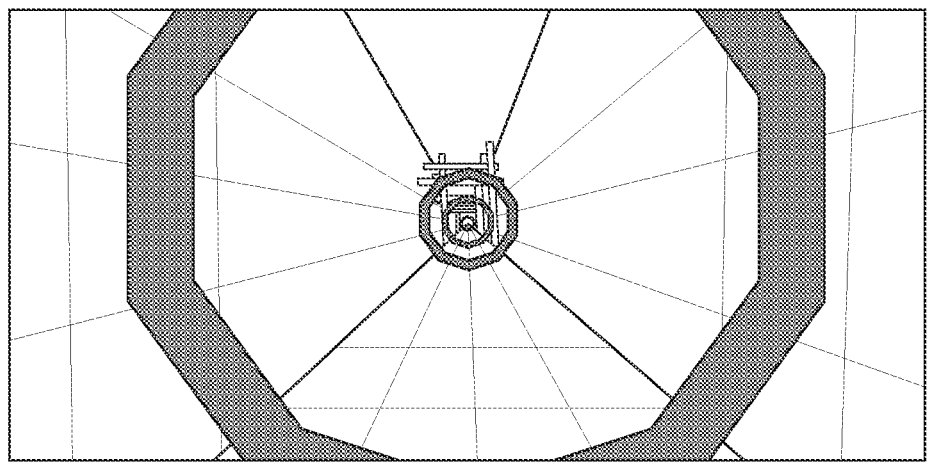

FIG. 6H . . . Video frame at t=6 immediately after start of falling

Figure 6I:
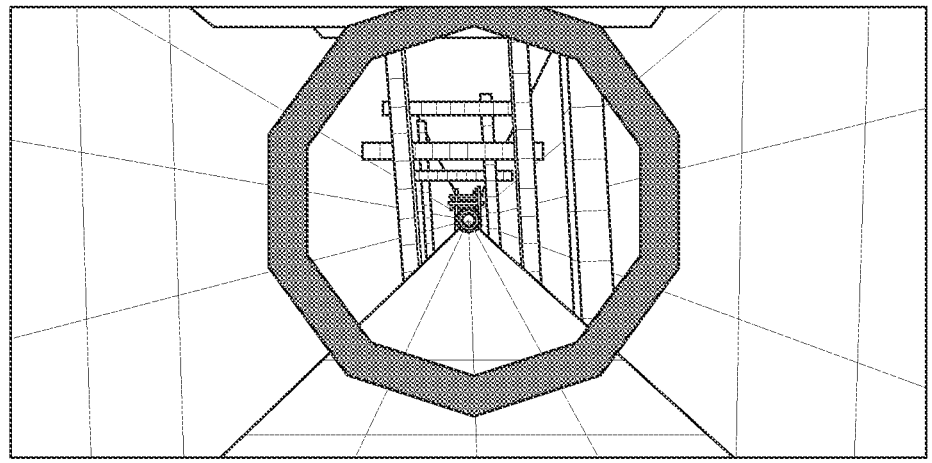

FIG. 6I . . . Video frame at t=7 immediately after start of falling

The falling video lasts four seconds, but the video frame at the time of falling described above is obtained by cutting out a part of the falling video, and video frames after t=7 are omitted. Actually, there are also video frames at the time of falling after t=7. Further, a video frame of the stop video in the state of FIG. 1 and a video frame at the time of floating after reaching a lowermost position are also omitted.

The bungee video software is started after the experiencing person 2 is fixed to the flat plate 100 as illustrated in FIG. 1. The bungee video software outputs a stop video including the video frame of FIG. 4A immediately before falling of FIG. 2. This stop video is a video immediately before falling of looking down from a rooftop of a building. In practice, the video frame of FIG. 4A is obtained by cutting out a visual field direction of the experiencing person 2 from a video in which the surroundings are displayed in 3D. For this reason, when the experiencing person 2 turns the neck up, down, left, and right, a moving image video in a visual field direction corresponding to the neck is displayed.

When the flat plate 100 starts to rotate from the state of FIG. 2 and the positioning sensor 110 detects that a distance from the VR headset 11 to the floor 3 becomes the height h1, the video is switched from the stop video to the falling video. The falling video is displayed on the display 112 as a moving image video that continuously changes at t=0, t=1, t=2 . . . .

Video frames from t=0 to t=7 are video frames when the experiencing person 2 jumps from a rooftop of a building and falls toward the ground. As continuous video at the time of falling is displayed on the display 112 in the VR headset 11 and the body of the experiencing person 2 rotates, the experiencing person 2 obtains a strong immersive feeling of falling.

The falling video further continues even after the flat plate 100 stops rotating and becomes in the inverted state of FIG. 3. However, the experiencing person 2 is impressed with a strong feeling of falling due to a bodily sensation of falling by the falling video after t=0 and the rotation of the flat plate 100. For this reason, although the rotation of the flat plate 100 is stopped, the experiencing person 2 has an illusion of continuously falling due to the above-described cross-modal effect by the subsequent falling video. By the above, even when rotation is performed in short time of one second, falling for four seconds can be virtually experienced.

When the falling video becomes a video of when reaching a lowermost position, the control unit 111 causes the hand switch 113 to vibrate. At this time, an assistant recognizes the vibration of the hand switch and reversely rotates the flat plate 100. At this time, the bungee video software switches the video from the falling video to a floating video of floating by moving up and down near the lowermost position. By the floating video and the reverse rotation of the flat plate 100, the experiencing person 2 has an illusion of returning upward or floating due to negative acceleration near the lowermost position.

FIG. 7 illustrates an electrical configuration diagram of the virtual experience device 1.

The VR headset 11 includes the positioning sensor 110 including a plurality of cameras, the control unit 111, and the display 112 capable of performing 3D display. The VR headset 11 is connected to the hand switch 113 and the blower 114 by Bluetooth (registered trademark). The control unit 111 includes a memory (not illustrated) in which the bungee video software is installed in advance.

FIG. 8 is a flowchart illustrating operation of the virtual experience device 1.

This flowchart is executed by the control unit 111 provided in the VR headset 11.

The VR headset 11 is activated as a power switch provided on the body is turned on. After activation, the bungee video software is activated by the hand switch 113 connected to the control unit 111 by Bluetooth (registered trademark) (ST1 and ST2) At this time, the video displayed on the display 112 is a stop video.

After the above, an assistant lifts a bottom part of the flat plate 100 located at the foot of the experiencing person 2 upward. Alternatively, the experiencing person 2 slightly moves forward to move the center of gravity of himself or herself forward (in a head direction), and raises both hands upward as necessary. Then, the flat plate 100 starts to rotate about the rotation support portion 102, and the rotation of the flat plate 100 is temporarily stopped in a state where the head is slightly lower than a horizontal position (FIG. 2). At this time, a distance between the VR headset 11 and the floor 3 is less than the predetermined height h1. As illustrated in FIG. 4A, a stop video of looking down from a rooftop of a building is output to the display 112 of the VR headset 11, and is in a state immediately before falling.

As the flat plate 100 further rotates from FIG. 2, the positioning sensor 110 detects that a distance between the VR headset 11 and the floor 3 reaches the predetermined height h1 to be in the second state (ST3). Then, the video is switched from the stop video to the falling video. The flat plate 100 rotates from the second state to the inverted state of FIG. 3. Time spent for this is one second. Since the falling video lasts four seconds, the falling video is displayed on the display 112 for a while in the inverted state of FIG. 3.

When the falling video becomes a video at a lowermost position (ST5), the hand switch 113 is vibrated. An assistant learns that the falling video becomes a video at the lowermost position, and rotates the flat plate 100 in a reverse direction at this timing. Then, the video is switched from the falling video to the floating video (ST7). The experiencing person 2 has an illusion of returning upward or floating due to negative acceleration near the lowermost position.

When the floating video ends, all operations end.

Note that in the present embodiment, the blower 114 connected by Bluetooth (registered trademark) is disposed on the floor 3 in front of the virtual experience device 1 (on the left side in FIGS. 1 to 3). At ST1, the control unit 111 starts blowing air from the blower 114. Blowing of air is stopped at ST5 or when ST7 ends. By synchronizing blowing air in this manner, it is possible to further enhance a feeling of falling in a bungee jump. It is considered that a sense of wind pressure due to blowing of air contributes to the above-described cross-modal effect. As a variation, an air blowing amount in ST4 can be made larger than an air blowing amount in ST1. By the above, wind at the time of falling (FIG. 2 to FIG. 3) is stronger than that at the time of stopping (FIGS. 1 and 2), and a feeling of falling becomes stronger. Further, in ST4, it is also possible to increase an air blowing amount as time elapses, and by this configuration, a feeling of falling becomes even stronger.

By the above operation, the flat plate 100 rotates from the state of FIG. 1 to the state of FIG. 3, and then, the stop video and the falling video at the time of a bungee jump are displayed on the display 112 in the VR headset 11 in synchronization with the rotation, so that the experiencing person 2 can experience an actual bungee jump with a strong immersive feeling in a virtual space.

As another embodiment, instead of the bungee video software, falling video software of a roller coaster can be installed. Even in the falling video software of a roller coaster, it is possible to experience a rapid descent in an actual roller coaster with a strong immersive feeling, similarly to the bungee video software.

Note that in the present embodiment, the instrument body 103 has a structure of an inverted V-shape, but the shape does not need to be the inverted V-shape as long as the flat plate 100 and the rotation support portion 102 can be stably held. Further, as long as the instrument body 103 can be kept substantially horizontal, the floor 3 may be combined with a table or a rail for rotating the instrument body 103 left and right or moving the instrument body 103 back and forth. With such a structure, it is possible to obtain a virtual experience closer to that in an actual bungee jump by rotating the instrument body 103 forward or rightward and leftward in a stopped state.

Further, rotation of the flat plate 100 can be performed not manually but automatically using a motor. Furthermore, in the present embodiment, time during which the flat plate 100 rotates to FIGS. 2 to 3 is set to one second, and output time of a falling video is set to four seconds, but the present invention is not limited to such time. These time periods are appropriately set according to a type (adult or child) of the experiencing person 2, size and a structure of the instrument body 103, a characteristic of video software (type or at the time of falling of a bungee jump or a roller coaster), and the like. These settings can also be made by a hand switch, a switch of the VR headset 11, or the like.

REFERENCE SIGNS LIST

1 virtual experience device
2 experiencing person
3 floor
10 instrument
11 VR headset
100 flat plate

The invention claimed is:

1. A virtual experience device that enables experiencing a feeling of falling, comprising:
    a flat plate on which an experiencing person is fixed in a prone posture without being moved up and down in a vertical direction;
    an instrument provided with a rotation support portion which supports the flat plate rotatably such that a vicinity of a waist portion of the experiencing person serves as a rotation center, the flat plate being rotatable from a first state in which a body of the experiencing person lies sideways with a head positioned above feet, to an inverted state in which the body of the experiencing person is inverted; and
    a VR headset attached to the head of the experiencing person, and including a display that displays an image in a virtual space,
wherein
    the device further comprises:
    a sensor that detects a second state of when the instrument rotates from the first state and a height from a floor surface on which the instrument is installed becomes equal to or less than a predetermined height;
    video software including a stop video displayed on the display in the first state and a falling video displayed on the display from when the second state is established,
    wherein the falling video includes;
    a first falling video displayed by the VR headset during a first time period until the body of the experiencing person stops in the inverted state, and
    a second falling video displayed by the VR headset during a second time period longer than the first time period after the body of the experiencing person has stopped in the inverted state,
    the second falling video being continuous with the first falling video, and the second falling video displayed while the body of the experiencing person is stopped in the inverted state causing, by a cross-modal effect, the experiencing person to continue to have an illusion of falling even after becoming stopped in the inverted state.

2. The virtual experience device that enables experiencing a feeling of falling according to claim 1, wherein the VR headset notifies outside that the falling video is in a lowermost position state when the falling video reaches a lowermost position.

3. The virtual experience device that enables experiencing a feeling of falling according to claim 1, wherein the stop video and the falling video include a video of bungee jumping.

* * * * *